United States Patent [19]
Lu et al.

[11] Patent Number: 5,880,865
[45] Date of Patent: Mar. 9, 1999

[54] WAVELENGTH-DIVISION-MULTIPLEXED NETWORK HAVING BROADCAST CAPABILITY

[75] Inventors: Xiaolin Lu, Matawan Township, Monmouth County; Sheryl Leigh Woodward, Holmdel Township, both of N.J.

[73] Assignee: Lucent Technologies Inc., Murray Hill, N.J.

[21] Appl. No.: 759,743

[22] Filed: Dec. 3, 1996

[51] Int. Cl.$^6$ .................................................. H04J 14/02
[52] U.S. Cl. ............................................ 359/125; 359/128
[58] Field of Search ...................... 359/124, 125, 359/127–128; 455/6.1–3.1; 348/6, 10, 12

[56] References Cited

U.S. PATENT DOCUMENTS 5,202,780  4/1993  Fussganger ............................ 359/125
5,694,234  12/1997  Darcie et al. ........................... 359/125

OTHER PUBLICATIONS

Video Services Delivery in Fiber in the Loop Systems Using MPEG Encoding and ATM Transport by J. R. Jones, published in IEEE Lasers and Electro–Optics Society 1993 Annual Meeting, Nov. 15–18, 1993.

*Primary Examiner*—Kinfe-Michael Negash

[57] ABSTRACT

A Wavelength-Division-Multiplexed (WDM) network provides delivery of both switched services and broadcast analog video over optical facilities through an intermediate optical apparatus (e.g., Passive Optical Network (PON)) splitter to a plurality of remote optical apparatuses (e.g., optical-network units (ONUs)). The broadcast signal is provided to only a selected ONU, together with the switched service signal for that selected ONU, the selected ONU then distributes the broadcast signal to other ONUs over a separate distribution facility interconnecting the ONUs.

17 Claims, 4 Drawing Sheets

WAVELENGTH-DIVISION-MULTIPLEXED NETWORK HAVING BROADCAST CAPABILITY

TECHNICAL FIELD OF THE INVENTION

This invention relates to wavelength-division-multiplexed networks and, more particularly, to a wavelength-division-multiplexed network having broadcast capability.

BACKGROUND OF THE INVENTION

It is expensive to provide analog broadcast TV over a passive-optical network (PON) because of the high carrier-to-noise ratio (CNR) required of these signals (~50 dB/4 MHz). To achieve this high CNR performance, very linear transmitters must be used, and the transmission power level should be such to ensure that enough signal power (i.e. 0.2 mW) reaches the optical receiver. Since the output power of transmitters is limited, a single transmitter can only serve a limited number of receivers (unless expensive optical amplifiers are used). Because the optical receiver is not shared by many users in a fiber-to-the-home (FTTH) or fiber-to-the-curb (FTTC) systems, the cost of the transmitter will not be shared among many users. It therefore is quite expensive to provide broadcast analog video over a PON.

This problem is present in both wavelength-division-multiplexed PONs (where the light's wavelength determines which ONU receives the signal) and power-splitting PONs (where the light is split at a power-splitter, and all the ONU's receive the same signals).

One illustrative switched digital video system which broadcasts analog video signals is described in the article entitled "Video Services Delivery in Fiber in the Loop Systems Using MPEG Encoding and ATM Transport" by J. R. Jones, published in IEEE Lasers and Electro-Optics Society 1993 Annual Meeting, Nov. 15–18, 1993. This system is basically a hybrid-fiber-coax (HFC) system combined with a FTTC-PON. The broadcast signal is sent to a fiber-node, which then transmits the broadcast signals over coaxial cable serving many users (hundreds). The PON provides switched services to each ONU. The coaxial cable provides the ONU with power, and from the ONU the switched signals and the broadcast signals are transmitted to the home.

Undesirably, the prior art has not fully integrated the two systems (HFC and PON). Transmitting the broadcast signals to the neighborhood over a PON should lower the cost of deployment, operations and maintenance.

SUMMARY OF THE INVENTION

The present invention solves the problem of providing cost effective delivery of both switched services and broadcast analog video over a Wavelength-Division-Multiplexed (WDM) network through an intermediate optical apparatus (e.g., the splitter of a Passive Optical Network (PON)) to a plurality of remote optical apparatuses (e.g., optical-network units (ONUs)). In accordance with the present invention, the problem is solved by interconnecting the ONUs, using a separate distribution facility, and sending the broadcast signal to only one selected ONU. This selected ONU then relays the broadcast signals to the other ONUs over the distribution facility.

According to one aspect of the invention, the WDM network includes a power-splitting PON and the wavelength of the optical broadcast signal is transmitted at a different wavelength than the wavelengths of the optical switched services' signals used by the ONUs, so that only the selected ONU receives the optical broadcast signal. In another arrangement the PON is a WDM PON and the splitter is a Dragone router. According to another aspect, the optical broadcast signal is transmitted to the selected ONU by modulating a Radio Frequency (RF) sub-carrier of the optical wavelength used to send the optical switched services signal to the selected ONU.

DETAILED DESCRIPTION

In the following description, each item or block of each figure has a reference designation associated therewith, the first number of which refers to the figure in which that item is first located (e.g., 105 is located in FIG. 1).

Figure 1:
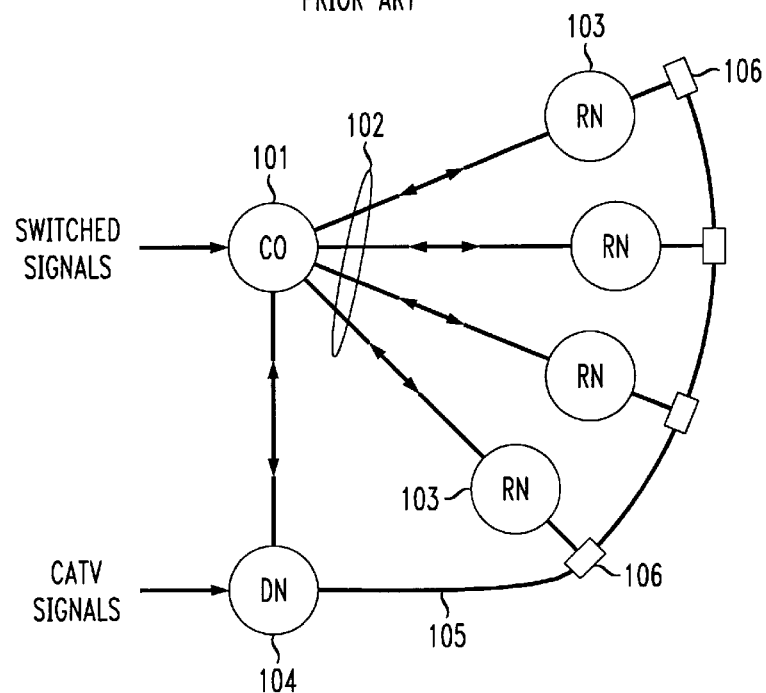
FIG. 1 shows a simplified illustrative switched services and broadcast analog video distribution system in accordance with the teachings of the previously-referenced Jones article.

With reference to FIG. 1, there is shown a simplified illustrative switched services and broadcast analog video distribution system in accordance with our interpretation of the previously-referenced Jones article. Switched signals are transmitted to and received from a central location 101, e.g., a Central Office (CO), for distribution over separate fibers 102 to a plurality of Remote Nodes (RN) 103. As shown, one or more of the RNs may further distribute the signals to other locations. The broadcast television signals, typically a CATV signal is received at a Distribution Network (DN) 104 for broadcast, along with electrical power, over a coaxial cable network 105 to the RNs 103. Power and signal taps 106 located along the coaxial cable network 105 drop the broadcast TV signal and power to the RNs 103.

Figure 2:
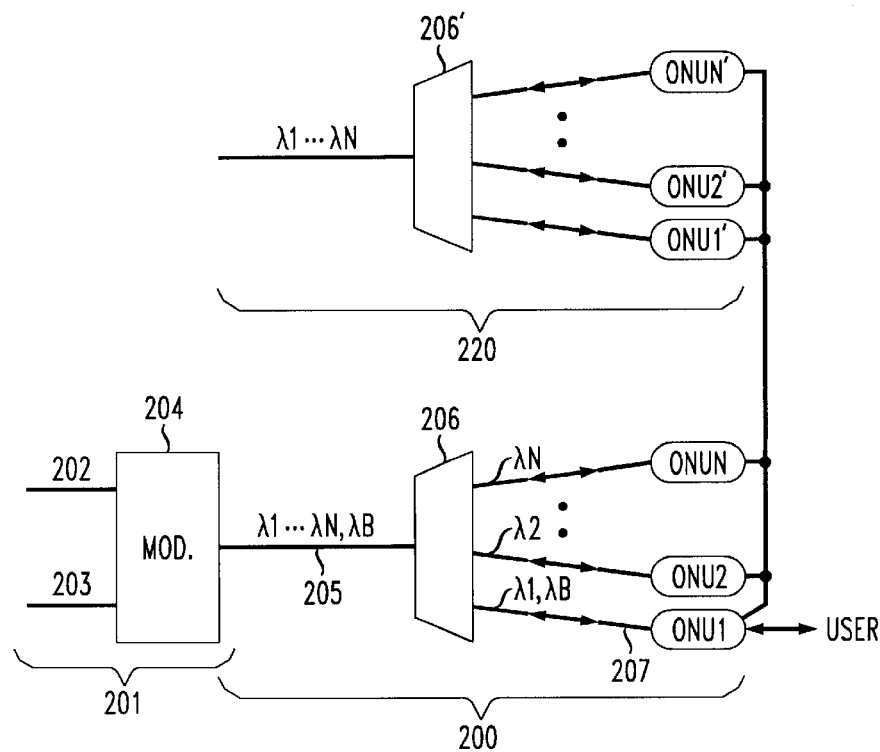
FIG. 2 shows a simplified illustrative wavelength-division-multiplexed (WDM) network for providing switched services and broadcast analog video distribution in accordance with the present invention.

With reference to FIG. 2, there is shown a simplified illustrative wavelength-division-multiplexed (WDM) network 200, in accordance with the present invention, for providing switched services signals and for broadcasting the analog CATV video signal to a plurality of Optical Network Units (ONUs). The WDM network 200 may be implemented using any of a variety of well-known arrangements. One illustrative PON that may be used is the "RITE-net" described in the article entitled "A Wavelength-Division Multiplexed Passive Optical Network with Cost Shared Components," published in Photonics Technology Letters, pp. 1365–1367, November, 1994, by N. J. Frigo et. al..

At Central Office (CO) location 201, both the electrical broadcast CATV signal 202 (in either analog format or digital baseband or passband format) and switched signals 203 are used to modulate different optical carriers, each carrier having a different wavelength, to form a wavelength-division-multiplexed (WDM) signal in modulator/combiner 204. The resulting modulated WDM signal including the switched signal modulated optical carriers at wavelengths $\lambda_1, \lambda_2, \ldots \lambda_N$, and the broadcast CATV modulated signal at wavelength $\lambda_B$ are sent over path 205 and through a splitter 206 to remote Optical Network Units ONU1-ONUN. The splitter 206 may be a wavelength-division demultiplexer, such as the "Dragone" router, as described in U.S. Pat. No. 5,136,671, entitled "Optical Switch Multiplexer and Demultiplexer," issued on Aug. 4, 1992, and incorporated by reference herein. Unless otherwise stated, in the remainder of this description the splitter 206 will be assumed to be a WDM router.

As shown WDM router 206 places both the switched signal at wavelength $\lambda_1$ and the broadcast CATV signal at wavelength $\lambda_B$ onto the optical facility 207, e.g., optical fiber and associated circuits, to ONU1 while each of the remaining switched signals at wavelengths $\lambda_2, \ldots \lambda_N$ are sent over a different optical facility to their respective remote ONU2-ONUN.

Splitter 206 directs each optical carrier to a single ONU based on the wavelength of the optical carrier. $\lambda_1$ and $\lambda_B$ are chosen such that both are transmitted to ONU1. If splitter 206 is a Dragone router, then this can be done easily, without altering the design of splitter 206 from the design used to implement RITE-Net without this invention. This is because the Dragone Router has a cyclic response, such that each output port of the router transmits a different set of wavelengths: $\lambda_i + k\Delta\lambda$ where k is an integer, and $\lambda_i$ is different for each output port ($\Delta\lambda$ depends on the design of the Dragone router used). Therefore, if $\lambda_B = \lambda_1 + \Delta\lambda$, then both the broadcast signal, and the switched signal at wavelength $\lambda_1$ will be transmitted to ONU1.

Each of the ONUs operate in a well known manner to convert the switched-signal optical carrier received from splitter 206 into electrical signals and modulate optical carriers with received electrical switched signals for transmission to CO 201. The ONU1 additionally splits the received switched signal transmitted at wavelength $\lambda_1$ and the broadcast signal transmitted at wavelength $\lambda_B$ into separate signals. The ONU1 converts the switched signal on the optical carrier received from splitter 206 into an electrical signal for the User and also uses the received electrical switched signals from the User to modulate an optical carrier for transmission to CO 201. The ONU1 additionally converts the received broadcast signal into an electrical signal suitable for transmission over the facility 210 which interconnects all of the ONUs. In accordance with the present invention, the broadcast signal may be analog or digital and the distribution facility 210 may be the existing cable TV distribution facilities ( e.g., coaxial cable) that already connect to users ( typical locations of the ONUs). In other implementations the distribution facilities may be coaxial cable, twisted pair, optical fiber, or wireless. When the distribution facility 210 is twisted pair or coaxial cable, ONU1 can also provide for power distribution to the other ONUs. The arrangement of FIG. 2 thus solves the problem of providing cost effective delivery of both switched services and an analog-video broadcast over a PON.

According to one aspect of the present invention, the WDM network of FIG. 2 provides route diversity, in the event of a failure in one or all of the primary signal paths to the ONUs. In such a circumstance, the broadcast-signal's path, or another primary switched-signal's optical carrier may be used with the distribution facility to provide a backup path for the transmission of a switched-services signal from the CO to one or more of the other ONUs, in the event of a failure in any of the optical facilities which connect to the one or more of the other ONUs.

FIG. 2 also shows a second WDM network (or PON network) 220 which distributes its own switched signal modulated wavelengths $\lambda_1, \ldots \lambda_N$ over different optical fibers to their respective remote ONUs. As shown, the ONUs of PON network 220 may receive the broadcast analog video (and power) over the distribution facility 210 which has been extended to connect thereto. The distribution facility 210 also provides route diversity for network 220.

Figure 3:
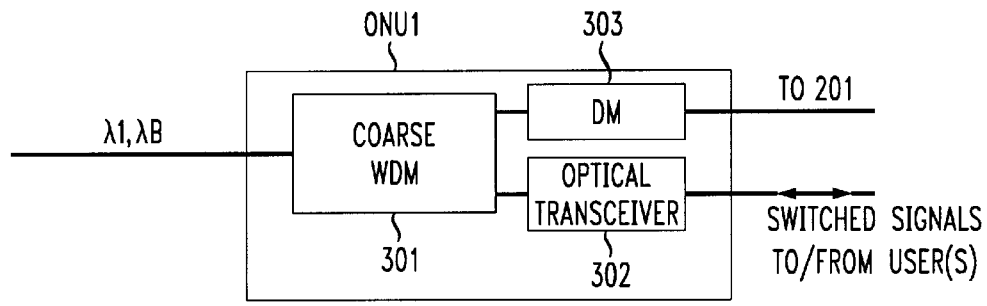
FIG. 3 shows an illustrative optical network unit (ONU) for use in the network of FIG. 2.

FIG. 3 shows an illustrative optical network unit ONU1 for use in the network of FIG. 2. As shown, a coarse WDM router 301 can be used in ONU1 to separate the switched signal modulated wavelength $\lambda_1$ and the broadcast CATV modulated wavelength $\lambda_B$ from the received signals $\lambda_1, \lambda_B$. The switched signal at wavelength $\lambda_1$ goes to optical transceiver 302. It is used for bidirectional communications between the users associated with ONU1 and the CO 101. The broadcast signals at wavelength $\lambda_B$ is received and converted, if necessary, to a signal format compatible for transmission over distribution facility 210 in distribution module 303.

Figure 4:
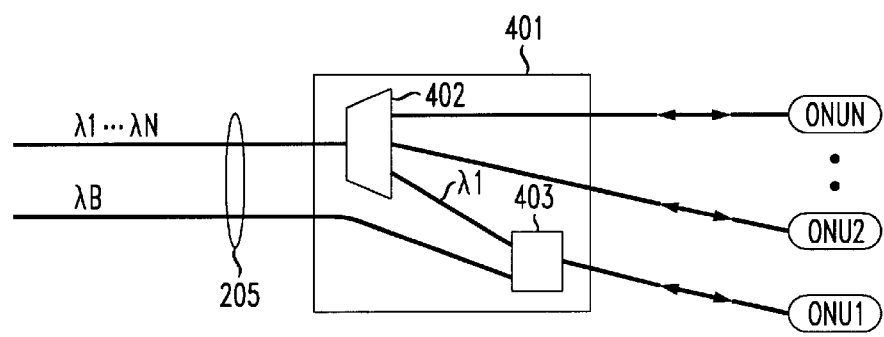
FIG. 4 shows an illustrative WDM router for use in the network of FIG. 2.

Shown in FIG. 4, is another embodiment of the present invention based on network 200. As shown, the illustrative optical splitter/conbimer 401 includes a WDM router 402 and a combiner 403. The illustrative optical splitter/combiner 401 receives the switched signal modulated optical wavelengths $\lambda_1, \lambda_2, \ldots \lambda_N$, and the broadcast CATV modulated signal $\lambda_B$. The WDM router 402 separates the received switched signals at wavelengths $\lambda_1, \lambda_2, \ldots \lambda_N$ into separate optical wavelength signals. The combiner 403 combines the optical wavelength $\lambda_1$ out of WDM router 401 with the broadcast CATV modulated signal $\lambda_B$ to form the combined optical signal $\lambda_1, \lambda_B$ for ONU1. In one illustrative arrangement, described later in FIG. 6, the wavelengths $\lambda_1, \lambda_2, \ldots \lambda_N$ may be closely spaced around a wavelength of 1.5 microns, while the broadcast CATV modulated signal $\lambda_B$, illustratively, occurring at a wavelength of 1.3 microns. In another illustrative arrangement, also described in FIG. 6, wavelengths $\lambda_1, \lambda_2, \ldots \lambda_N$ are replaced with a single optical carrier at wavelength $\lambda_1$, and the splitter 402 is a power splitter. The broadcast CATV modulated signal $\lambda_B$, is combined with the optical carrier carrying signals to ONU1 at combiner 403.

Figure 5:
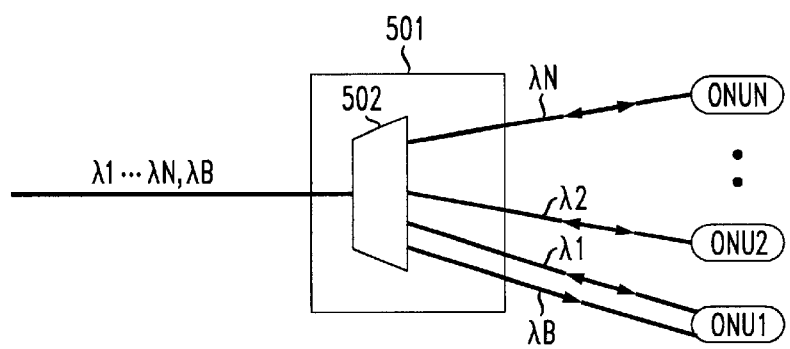
FIG. 5 shows an alternative WDM router for use in the network of FIG. 2.

FIG. 5 shows an alternative WDM router to ONUs connection arrangement 501. As shown the WDM router 502 splits the combined optical signal $\lambda_1, \lambda_2, \ldots \lambda_N$, and $\lambda_B$ into separate wavelengths, each wavelength being sent to an ONU over a separate optical fiber. In such an arrangement, 501 connects to ONU1 using two fibers, a separate fiber for each of the two different wavelengths $\lambda_1$ and $\lambda_B$. Such an arrangement eliminates the need for a wavelength demultiplexer at ONU1.

Figure 6:
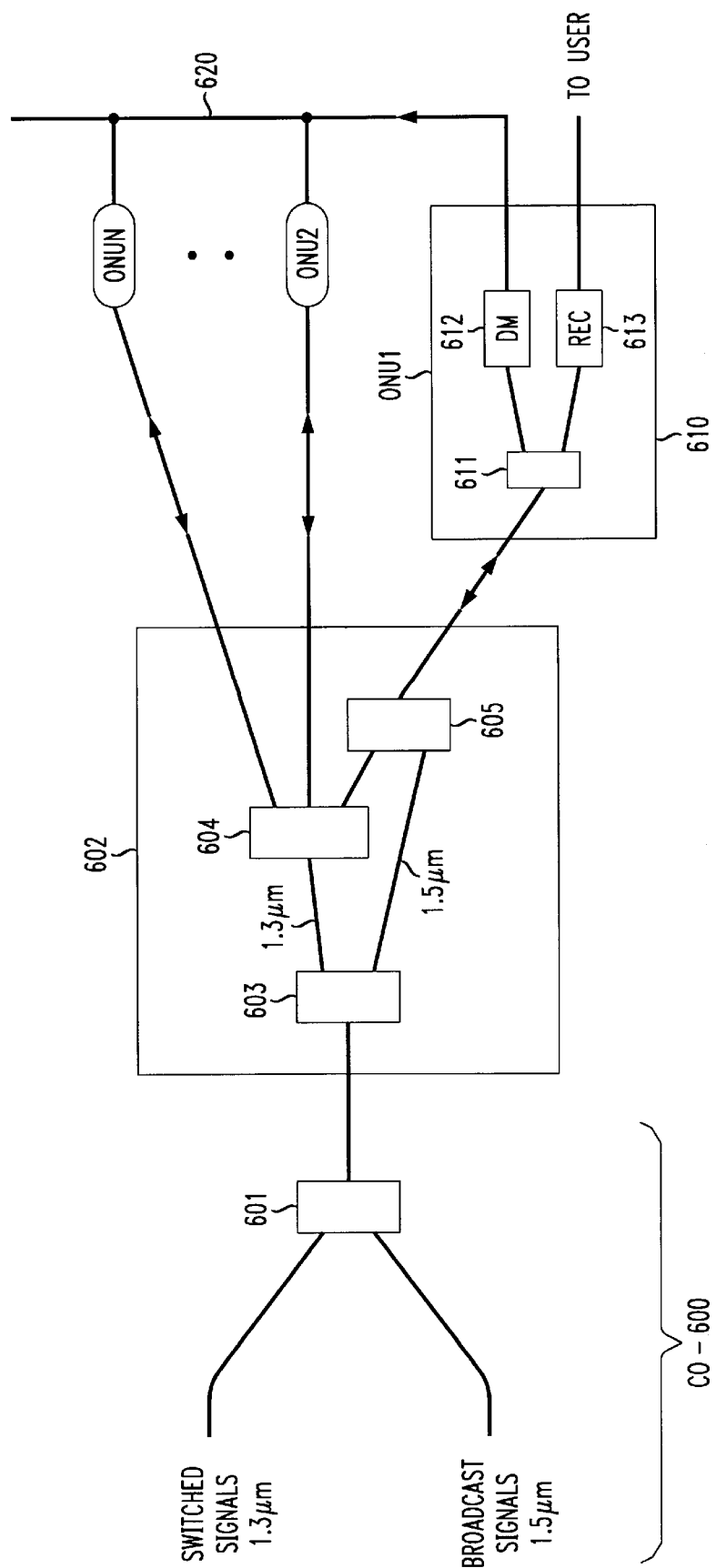
FIG. 6 shows another illustrative WDM network in accordance with the present invention.

FIG. 6 shows another illustrative WDM network in accordance with the present invention. As shown, each of the switched signals could be modulated onto different wavelengths $\lambda_1, \lambda_2, \ldots \lambda_N$, all near 1.5 micron. Alternatively they could be transmitted using one optical carrier with wavelength $\lambda_1$. The broadcast signal, illustratively, is transmitted using a 1.3 micron wavelength optical carrier. These signals are then multiplexed together in a combiner 601 (or multiplexer). The splitter/combiner circuit 602 includes a "coarse" 1.3/1.5 micron demultiplexer (or router) 603 to produce separate 1.3 and 1.5 micron wavelength optical signals. When multple optical carriers are used to transmit the switched signals then splitter 604 is either a "fine" demultiplexer or router which separates the closely spaced wavelengths $\lambda_1, \lambda_2, \ldots \lambda_N$. When a single optical carrier is used to transmit the switched signals then splitter 604 is a power splitter. A combiner 605 combines the approximately 1.5 micron wavelength signal $\lambda_1$, with the broadcast signal $\lambda_B$ at 1.3 microns. The resulting optical signal is then sent to ONU1 610. At ONU1 a demultiplexer 611 separates the 1.5 micron switched signal from the 1.3 micron broadcast signal. As previously described, the optical broadcast signal is demodulated and converted by distribution module (DM) 612 into the type of signal needed for distribution over facility 620 to the other ONUs. The 1.5 micron switched signal is received and demodulated at receiver 613 and outputted to the users.

Figure 7:
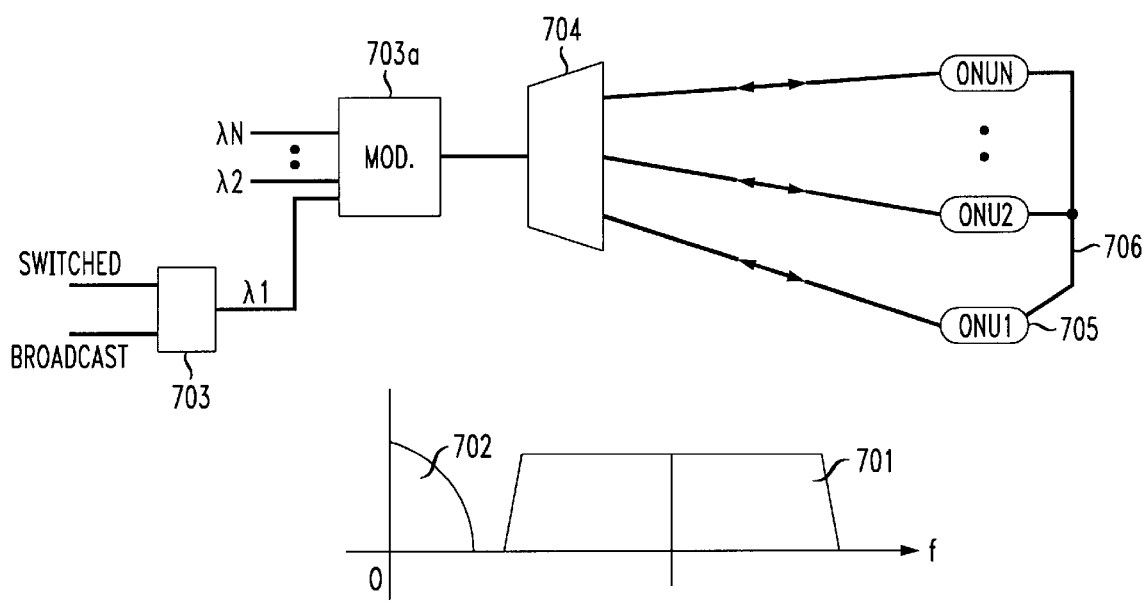
FIG. 7 shows yet another illustrative WDM network, in accordance with the present invention, which uses subcarrier modulation to carry the broadcast signal.

FIG. 7 shows yet another illustrative WDM network, in accordance with the present invention, which uses Radio Frequency (RF) subcarrier(s) in the frequency band 701 to carry the broadcast signal over the same wavelength $\lambda_1$ used to carry the switched signals. If necessary, the broadcast signal is frequency converted from its original band into frequency band 701 to insure frequency separation from the switched signals 702. The switched and broadcast signals are combined and modulate the optical carrier at wavelength $\lambda_1$ in modulator 703. The other switched signals are used to modulate the optical carriers at wavelengths $\lambda_2, \ldots \lambda_N$. These optical carriers are summed in combiner 703a with the optical carrier at wavelength $\lambda_1$ from modulator 703. The resulting signal is then sent to WDM router 704 which separates the wavelengths for transmission over different fibers to the respective ONUS, as previously described. At ONU1 705, the signal at $\lambda_1$ is converted into an electrical signal and using standard RF techniques, separated into the switched signal and the broadcast signal. As previously described, the broadcast signal is converted into the type of electrical signal needed for transmission over broadcast distribution facility 706 to the other ONUs. The demodulated switched signal is outputted to the users associated with ONU1.

What has been described is merely illustrative of the application of the principles of the present invention. Other arrangements and methods can be implemented by those skilled in the art without departing from the spirit and scope of the present invention.

We claim:

1. A Wavelength-Division-Multiplexed (WDM) optical network comprising a first optical apparatus, including an optical splitter, for communicating each of a first set of optical switched services signals over a separate optical facility to each of a plurality of Optical Network Units (ONUs) and for communicating an optical broadcast signal to a selected one of the plurality of ONUs and said selected ONU connected to a distribution facility which interconnects to one or more of the plurality of ONUs, said selected ONU including means for communicating the optical broadcast signal over the distribution facility to the other one or more of the ONUs.

2. The WDM network of claim 1 wherein the optical splitter includes a splitter which sends signals over the separate optical facility to the ONUs and a combiner which combines the first optical signal being transmitted to the selected ONU with the optical broadcast signal.

3. The WDM network of claim 2 wherein the combiner is a wavelength-division multiplexer and wherein the first optical signal is transmitted to the selected ONU is transmitted using a different wavelength than the wavelength used to transmit the optical broadcast signal.

4. The WDM network of claim 1 wherein the selected ONU includes a splitter for separating the received broadcast and switched services.

5. The WDM network of claim 1 wherein the optical broadcast signal is transmitted to the selected ONU by modulating a Radio Frequency (RF) sub-carrier on a wavelength used for transporting the optical switched services signal to the selected ONU.

6. The WDM network of claim 1 wherein the selected second optical apparatus sends power over the distribution facility to one or more of the other second optical apparatuses.

7. The WDM network of claim 1 wherein the path for carrying broadcast signals is used to provide a backup path for the transmission of switched services signal over the distribution facility to one or more of the other second optical apparatuses, in the event of a failure in any of the optical facilities which connect to the one or more of the other second optical apparatuses.

8. The WDM network of claim 1 wherein a separate optical facility to the selected second optical apparatus is used to provide a backup path for the transmission switched services signal over the distribution facility to one or more of the other second optical apparatuses, in the event of a failure in any of the optical facilities which connect to the one or more of the other ONUs.

9. The WDM network of claim 1 wherein each of the first set of signals and the optical broadcast signal use different wavelengths.

10. The WDM network of claim 9 wherein the first optical apparatus includes a coarse splitter for separating the different optical wavelength used for the switched services signals from the wavelength used for the optical broadcast signal, a second splitter for dividing the switched services signals wavelengths for communication to each of the plurality of second optical apparatuses, and a multiplexer for combining the optical broadcast signal from the coarse splitter with an optical wavelength switched services signal from the second splitter for communication to the selected second optical apparatus.

11. The WDM network of claim 10 wherein the second splitter is a power splitter which divides the optical power of the first set of signals communicated to each of the plurality of second optical apparatuses.

12. The WDM network of claim 10 wherein the second splitter is a fine wavelength-division demultiplexer for separating different optical wavelength switched services signals for communication to each of the plurality of second optical apparatuses.

13. The WDM network of claim 1 wherein the first set of signals use a first wavelength and the optical broadcast signal uses a different second wavelength.

14. A Wavelength-Division-Multiplexed (WDM) network comprising a first optical apparatus, including a Dragone router, for communicating each of a first set of optical signals, transmitted using different optical wavelengths, over a separate optical facility to each of a plurality of second optical apparatuses and for communicating an optical broadcast signal to a selected one of the plurality of second optical apparatuses and said selected second optical apparatus connected to a distribution facility which interconnects to one or more of the plurality of second optical apparatuses, said selected second optical apparatus including means for communicating the optical broadcast signal over the distribution facility to the other one or more of the second optical apparatuses.

15. A method of operating a Wavelength-Division-Multiplexed (WDM) network comprising the steps of:

communicating, from a first optical apparatus including an optical splitter, each of a set of optical switched services signals over a separate optical facility to each of a plurality of Optical Network Units (ONUs) and communicating an optical broadcast signal to a selected one of the plurality of ONUs and receiving, at a selected ONU of the plurality of ONUs, the broadcast signal and communicating the optical broadcast signal over a separate distribution facility which interconnects the selected ONU to the other one or more of the ONUs.

16. A first optical apparatus for use in a Wavelength-Division Multiplexed (WDM) network comprising first means, including an optical splitter, for communicating at one optical wavelength, switched services signals over a separate optical facility to each of a plurality of Optical Network Units (ONUs) of the WDM network and second means, including an optical combiner, for communicating a different optical wavelength signal to a selected one of the plurality of ONUs for distribution over a distribution facility to one or more of the ONUs.

17. A first optical apparatus for use in a Wavelength-Division Multiplexed (WDM) network comprising first means, including an optical splitter, for communicating switched services signals over a separate optical facility to each of a plurality of Optical Network Units (ONUs) of the WDM network, using a different wavelength for each ONU and second means, including an optical combiner, for communicating a different optical wavelength signal to a selected one of the plurality of ONUs for distribution over a distribution facility to one or more of the ONUs.

* * * * *